(12) United States Patent
Jyrinki

(10) Patent No.: US 7,183,908 B2
(45) Date of Patent: Feb. 27, 2007

(54) ALARM IN ELECTRONIC DEVICE

(75) Inventor: Kimmo Jyrinki, Oulu (FI)

(73) Assignee: Nokia Corporation, Espoo (FI)

( * ) Notice: Subject to any disclaimer, the term of this patent is extended or adjusted under 35 U.S.C. 154(b) by 159 days.

(21) Appl. No.: 10/974,395

(22) Filed: Oct. 27, 2004

(65) Prior Publication Data

US 2005/0099893 A1    May 12, 2005

(30) Foreign Application Priority Data

Oct. 28, 2003   (FI)   ................................ 20031570

(51) Int. Cl.
*G08B 1/08* (2006.01)
(52) U.S. Cl. ............... 340/539.1; 340/517; 340/309.16
(58) Field of Classification Search ........... 340/309.16, 340/517, 539.1, 457; 368/10, 12, 47; 455/73
See application file for complete search history.

(56) References Cited

U.S. PATENT DOCUMENTS

| | | | |
|---|---|---|---|
| 5,786,768 A | | 7/1998 | Chan et al. ................. 340/632 |
| 5,995,455 A | * | 11/1999 | Kutosky ....................... 368/73 |
| 6,057,769 A | * | 5/2000 | Stevenson ................... 340/601 |
| 6,714,136 B1 | * | 3/2004 | Auyang et al. ........ 340/825.24 |
| 2002/0099550 A1 | * | 7/2002 | Emerick, Jr. ................ 704/270 |
| 2004/0235513 A1 | * | 11/2004 | O'Connell ............... 455/550.1 |

FOREIGN PATENT DOCUMENTS

GB    2 030 328 A    4/1980

\* cited by examiner

*Primary Examiner*—Phung T. Nguyen
(74) *Attorney, Agent, or Firm*—Hollingsworth & Funk, LLC

(57) ABSTRACT

An electronic device comprising means for setting a primary alarm method, means for setting an alarm time, means for checking at the alarm time one or more alarm conditions relating to the primary alarm method, means for giving the alarm by using the primary alarm method if the alarm condition is met, and means for giving the alarm by using a secondary alarm method if the alarm condition is not met.

21 Claims, 3 Drawing Sheets

ALARM IN ELECTRONIC DEVICE

FIELD

Figure 1:
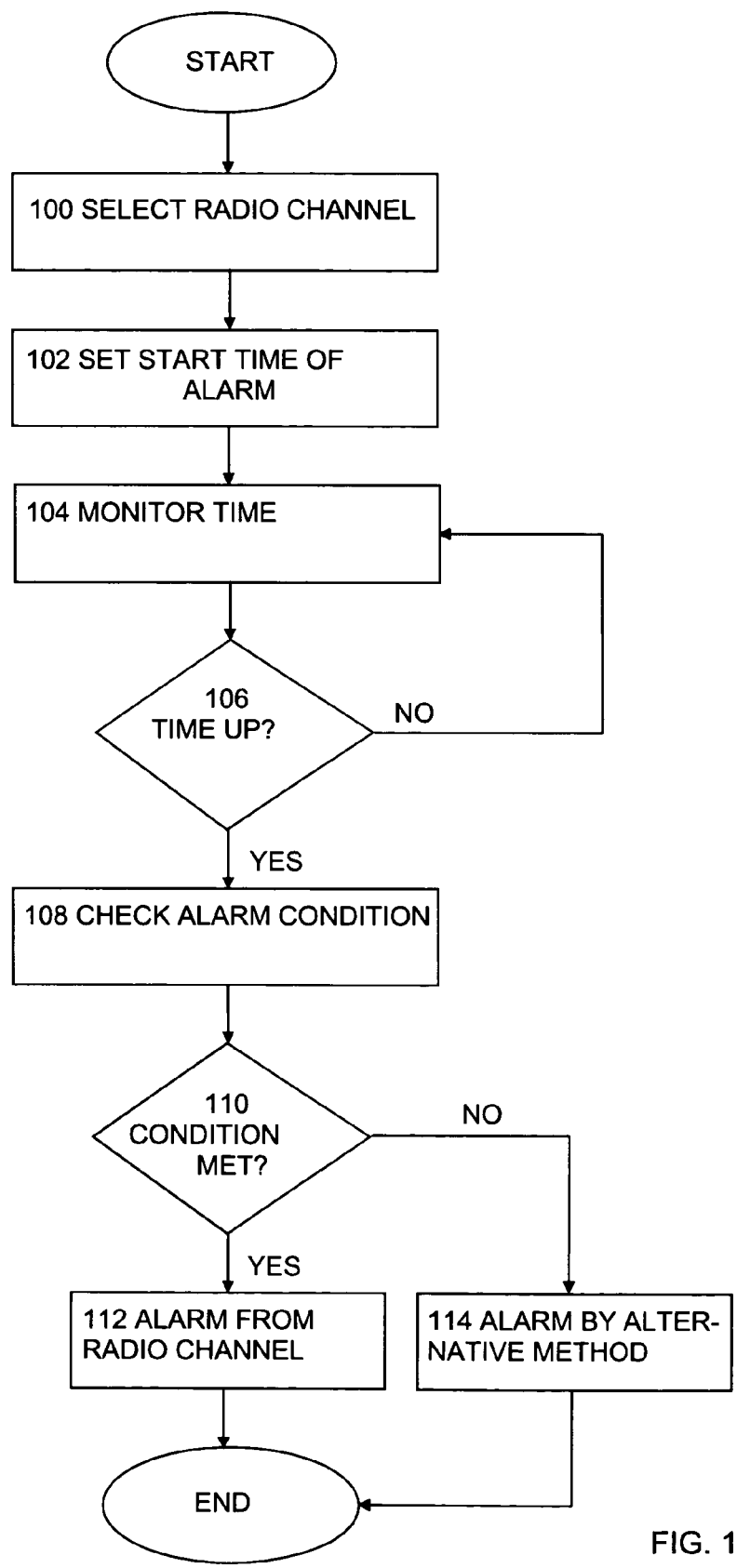

The invention relates to giving an alarm in an electronic device.

BACKGROUND

Giving an alarm, such as a wake-up or an alarm based on a calendar marking, is an important function in electronic devices.

If, for one reason or another, the alarm method used in giving the alarm does not function in the desired manner, it is possible that there is no alarm or it is so weak that it does not attract the attention of the user in the desired manner.

BRIEF DESCRIPTION

It is an object of the invention to provide an improved method and apparatus for implementing an alarm in an electronic device.

The invention relates to a method for implementing an alarm in an electronic device, which method comprises setting a primary alarm method and a start time for the alarm. At the time of the alarm, the method checks one or more alarm conditions relating to the primary alarm method, gives the alarm by using the primary alarm method if the alarm condition is met, and gives the alarm by using a secondary alarm method if the alarm condition is not met.

The invention also relates to an electronic device comprising means for setting the primary alarm method and means for setting the alarm time. The device comprises means for checking, at the time of the alarm, one or more alarm conditions relating to the primary alarm method, means for giving the alarm by using the primary alarm method if the alarm condition is met, and means for giving the alarm by using a secondary alarm method if the alarm condition is not met.

The invention also relates to a subassembly for an electronic device, comprising means for receiving an alarm time defining the time of the primary alarm. The subassembly comprises means for checking, at the time of the alarm, one or more alarm conditions relating to the primary alarm method, means for deciding on the alarm method, which decision means are configured to decide that the alarm is given using the primary alarm method if the alarm condition is met, and the decision means are otherwise configured to decide that the alarm is given using a secondary alarm method.

The invention also relates to a software product comprising means for receiving an alarm time defining the time of the primary alarm. The software product comprises means for checking, at the time of the alarm, one or more alarm conditions relating to the primary alarm method, means for deciding on the alarm method, which decision means are configured to decide that the alarm is given using the primary alarm method if the alarm condition is met, and the decision means are otherwise configured to decide that the alarm is given using a secondary alarm method.

Preferred embodiments of the invention are set forth in the dependent claims.

According to the invention, the primary alarm method is thus backed up by a secondary alarm method. The electronic device can be any electronic device, in which it is necessary to give alarms. The primary alarm method may originate from a source that is external to the device or it may alternatively be stored in the device or generated in the device when necessary. If it is an external alarm source, the electronic device may be a clock radio-type device, for example, or at least have the properties of a clock radio. Thus, a clock radio can be in a mobile phone, for instance.

In the description of the invention, an alarm refers to any information content that is intended to attract the attention of the user of the device or of people in the vicinity of the device. The alarm may thus be based on for example a sound, vibration or light of the device or some other form of alarm attracting attention.

The alarm time may for instance in the case of the clock radio be related to a morning wake-up. In the case of a mobile phone, the alarm time may for instance be the start time of a calendar event, such as a meeting.

In one embodiment, the primary alarm method is an FM (frequency modulation) radio channel, to which the device is tuned. The primary alarm method can also be an IP (Internet protocol) based radio channel or a service that can be subscribed to and used as an alarm. In addition, the primary alarm method can also be a digital broadcast, such as a DAB (digital audio broadcasting) or DVB (digital video broadcasting) based transmission. Instead of the above-mentioned external alarm methods, the primary alarm method can also be an internal alarm method stored in the device, such as a musical piece stored by the user. The secondary alarm method backing up the primary alarm method can, in turn, be a sound signal, musical piece or some other corresponding information content stored in the device or generated in the device.

At or around the time of the alarm, one or more alarm conditions relating to the primary alarm method are checked. The alarm condition check can be started before the desired start time of the alarm, exactly at the desired time or after the time. The monitoring of the alarm condition can be continued for instance until the user switches off the alarm given by the device. Thus, the check to see whether the alarm condition is met can be started before the actual alarm time, and it can be done momentarily or continuously even after the start of the actual alarm time. In such a case, if after the start of the alarm and during the giving of the alarm, the primary source weakens so that it does not meet the predefined alarm condition, the primary alarm source can be replaced with the secondary alarm source even during the alarm.

In the following description of the invention, the checking of the alarm condition is described mainly with respect to the checking of a given measuring parameter. For instance, if the primary alarm method is an FM radio channel, it is possible to check as the alarm condition whether the reproduction volume of the channel is sufficient in the device, whether the channel is broadcasting at all, or whether the electronic device is in the coverage area of the radio channel. Further, it can be tested whether the radio channel is appropriately tuned. If the electronic device is a mobile phone that uses an IP radio as the primary alarm method, it can be tested whether the mobile phone has a connection with an IP-transmitting network (mobile network, WLAN, IPDC, DVB-H), and whether the service in the network is active. Correspondingly, if a local alarm is used as the primary alarm, the volume of the alarm or some other parameter of the alarm can be tested. In addition to the measuring parameter-type checks described above, the tested alarm condition can also be, whether the link or reference to the information content intended to be the alarm is in order, or whether the information content exists at all in the manner assumed by the user/device. This way, it is possible to avoid a situation, for instance, that the user has loaded a musical piece from a data network, but during the loading or storing, an error has occurred that prevented the reproduction of the piece as an alarm. The alarm condition and its check thus generally refer to actions that endeavor to check, whether the primary alarm method is available and of sufficient quality.

The solution of the invention provides the significant advantage that it is possible to make sure that the alarm is always available, even if the primary alarm method was not available or did not provide an alarm of sufficient quality.

LIST OF FIGURES

Figure 2:
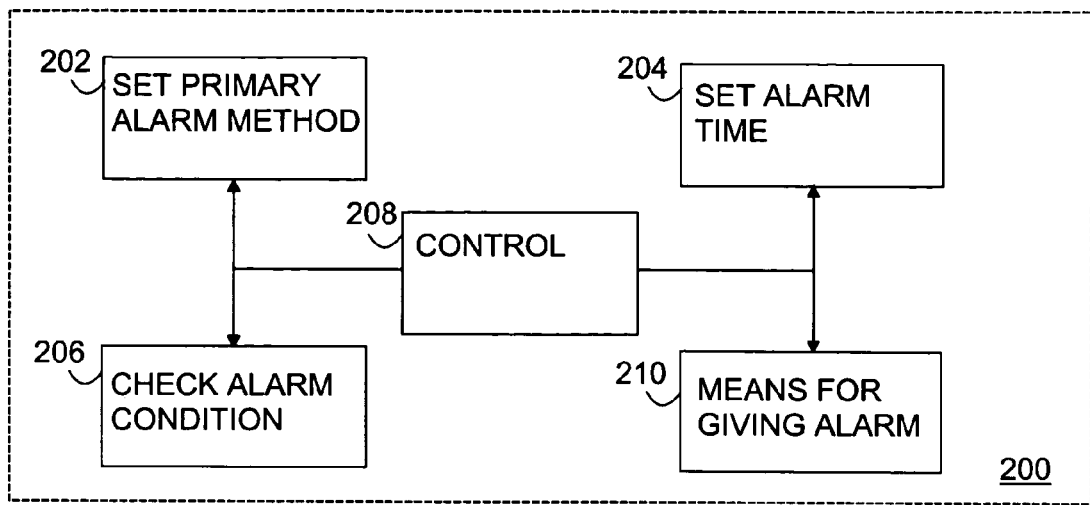
Figure 3:
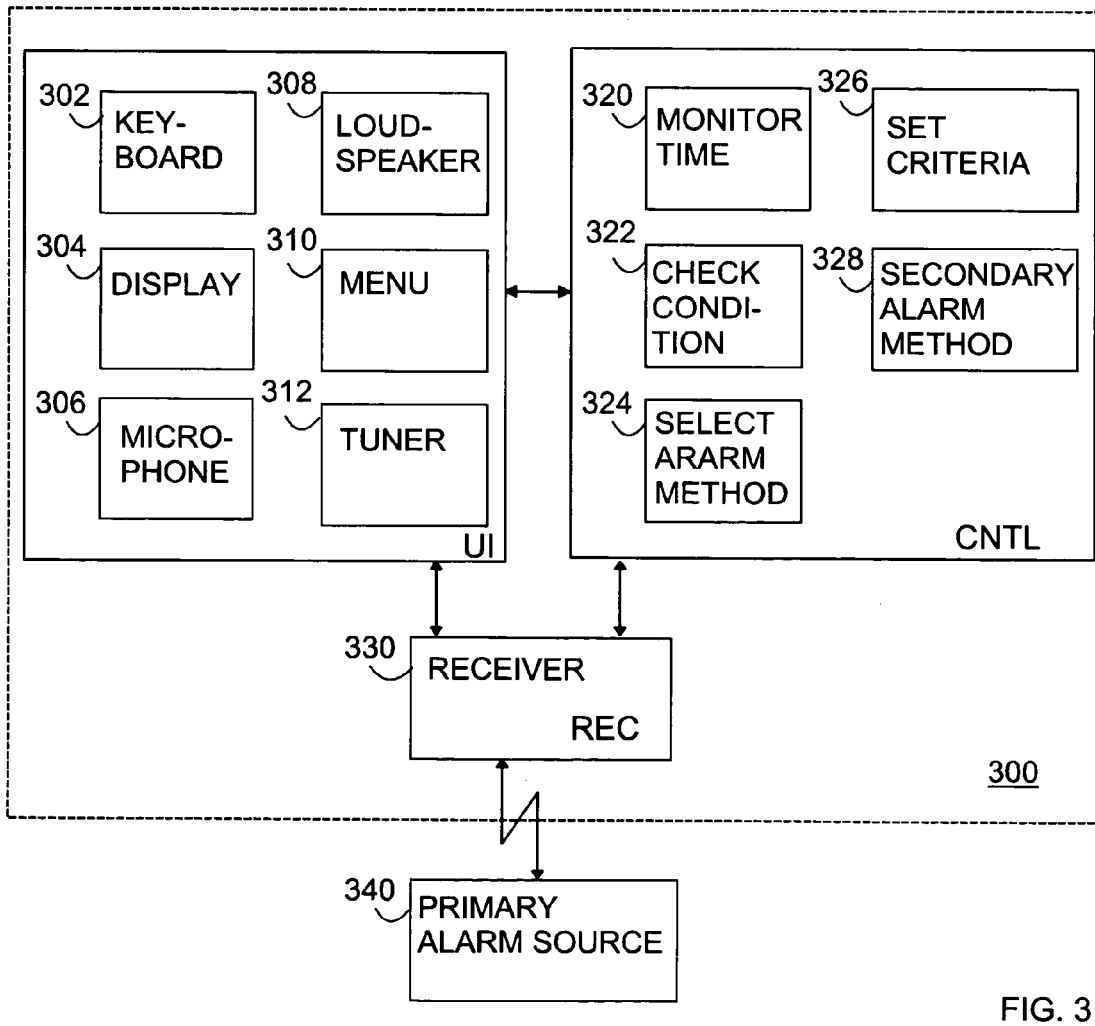
Figure 4:
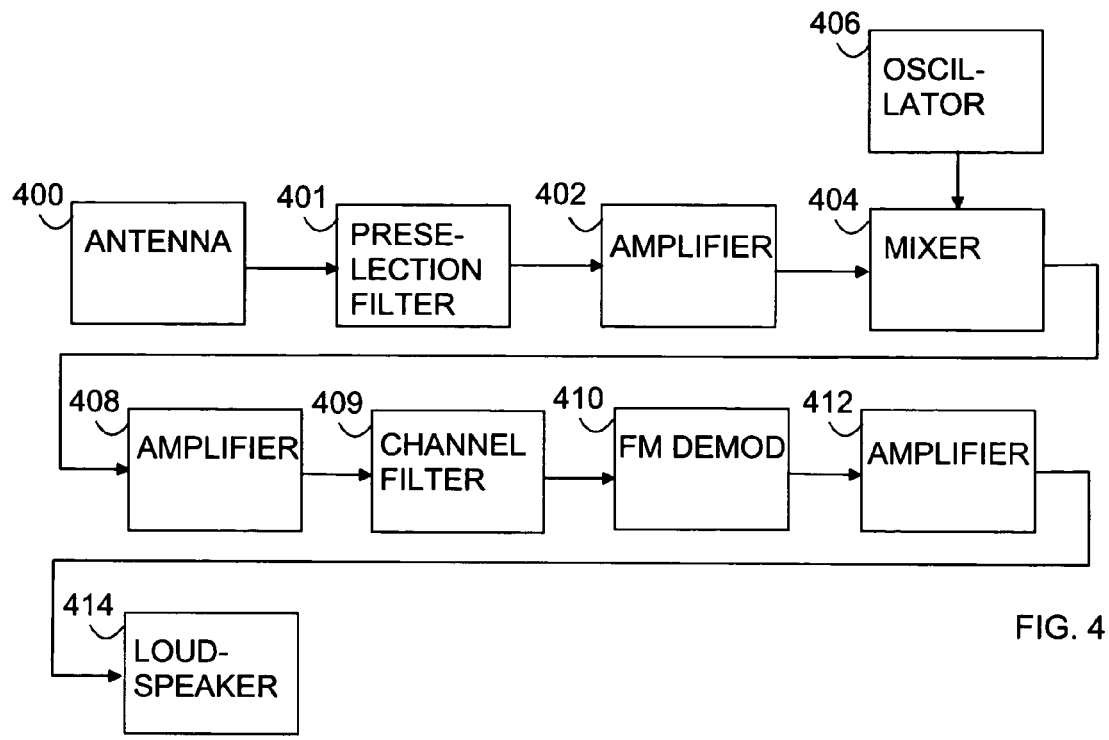
Figure 5:
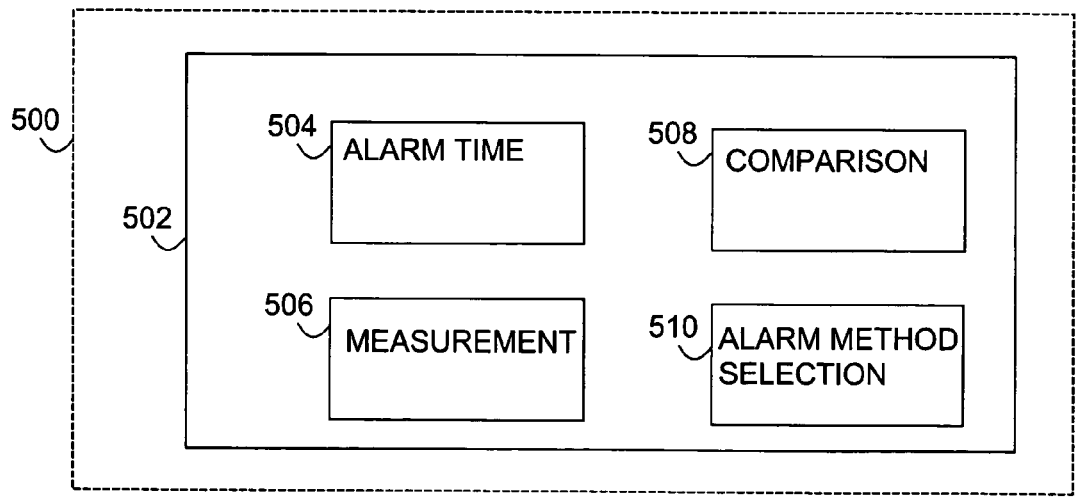

In the following, the invention will be described with reference to the attached figures, in which FIG. 1 shows an embodiment of the method, FIG. 2 shows an embodiment of the electronic device, FIG. 3 shows a second embodiment of the electronic device, FIG. 4 shows a yet further embodiment of the electronic device, FIG. 5 shows a subassembly for the electronic device.

DESCRIPTION OF EMBODIMENTS

FIG. 1 shows an embodiment of the method according to the invention. In the starting step 100 of the method, a primary alarm method, for instance FM, DAB or IP radio channel, is selected in an electronic device. The alarm method can also be for instance a musical piece ordered separately from a service provider, or some other service content containing sound, or information that can be transformed into a signal suitable as an alarm. The primary alarm method can also be an alarm generated locally in the device, such as a musical piece loaded into the device and stored in memory.

After the selection of the alarm method, the desired alarm time is set 102 in the device. For instance, in the case of a wake-up or reminder, the time is set in the form: hours+ minutes. Naturally, the alarm can also be set as the time remaining to the alarm, in which case the form "08:05:30" means that the alarm will be given after eight hours, five minutes and thirty seconds.

In step 104, the electronic device monitors time, either by comparing the set time with the current time or by increasing/decreasing a set time counter. If a comparison in step 106 indicates that the alarm time is at hand, the device moves on to the next method steps to decide the method of giving the alarm. It should be noted that the decision to move to the actions preparing for the alarm could be made before the actual alarm time or after it. For instance, the alarm condition check according to step 108 by measuring the radio channel can be started ten seconds before the time of the alarm. Alternatively, it is possible to wait until the alarm time and then start the radio channel measurements.

If in step 100, an FM channel was set as the primary alarm method, the radio channel measurement in step 108 refers for instance to the fact that the reproduction of the radio channel meets a threshold condition set on the volume level in the electronic device. The user can set the threshold condition in advance, or it can be predefined in the device. If the user wants to set a wake-up for the next morning in the device, the user selects in the evening a suitable threshold sound level in the device, which level should be achieved in the actual alarm for the primary alarm method to be accepted. The user can select the threshold sound level for instance by the ear by listening the sound sample at different volume levels and by selecting the suitable one. Alternatively the threshold sound level can be selected numerically to have a certain decibel level. It is naturally also possible to use some other scale in the selection of the sound reproduction level. In terminal equipment, the volume of the alarm can for instance be selected on a scale of 1 to 10, in which 10 is the maximum value of volume reproduction. Instead of a numeric scale, a stepless sliding scale or another corresponding method can also be used.

In an electronic device, the decision on the acceptance of the primary sound source can thus be made on the basis of the reproduction volume. Volume can be measured at several points of the reception chain of a radio signal. One possibility is to measure the volume of the sound reproduced by the loudspeakers of the device by feedback with the microphone of the device, in which case the decision is made on the basis of the output received by the microphone. Alternatively, it is possible to measure in the device the strength of the signal directed to the loudspeaker.

In the case of an FM radio, it is possible by measuring volume to indirectly determine whether the channel tuned in by the user is broadcasting. The device can also endeavor to analyze whether the channel is broadcasting by analyzing the spectrum and shape of a received radio signal. A substantially unchanged spectrum may indicate that the channel is not broadcasting at the time of the alarm. In an FM radio, it is also possible to examine the level and quality of a received signal. A qualitative analysis of the signal can be made by estimating the signal-to-noise ratio (S/N) or signal-to-interference ratio (SIR) or signal-plus-noise-plus-distortion to noise-plus-distortion ratio (SINAD). Tuning in to the correct channel can also be checked with an automatic frequency control (AFC) signal, for instance.

If the primary alarm method is a radio channel of an IP radio or another service utilizing a telecommunications network, the threshold condition can be checked by using the reproduction of volume as in the FM radio. The threshold condition 110 check can also contain checking whether the mobile station is connected to the used network. If there is no connection, it is naturally not possible to use any network-dependent services. Further, in the case of a telecommunications network-based service, the situation in the terminal equipment may be that a connection to the network exists and packets are received from the service as usual, but the packets are empty or filled with filler information. It may also be that the network part providing the service, such as a server, is not available. In such a case, the terminal equipment set to use said external service cannot reproduce anything and the alarm is not given.

If the primary alarm source is a local alarm method, the device can test, whether the volume produced by the alarm method is sufficient. If the primary alarm method is for instance a musical piece downloaded from a telecommunications network, it may happen that the downloading is unsuccessful and the volume of the piece is not sufficient. Thus according to one embodiment, even a locally produced primary alarm method is checked and backed up with a secondary alarm method, if necessary. The above describes by way of example some ways of checking, whether the alarm of the primary alarm method fulfils the requirements set thereto. It is clear that even several of the criteria described above can be examined when evaluating the primary alarm method. For instance, if the primary alarm method is an IP radio, a mobile phone can check both the connection of the phone to the network and that the content of the IP packets also contains other items than filler information.

If the threshold condition in step 110 is met, alarm is given 112 with the primary alarm method. If the condition is not met, alarm is given 114 with the alternative, i.e. secondary, alarm method. The secondary alarm method can be a sound content defined in the device, such as a musical piece stored by the user in the device. The secondary alarm method can also be a fixed signal tone in the device, the operation of which is ensured. Such a fixed signal tone can be digitally stored. The secondary alarm method can be a standard sound, even one produced mechanically, such as the sound of an alarm clock. A random sound generated by a certain algorithm, for instance, can also be used to provide the secondary alarm.

Even though the method is described above only by means of a primary and a secondary alarm method, it is clear that the back-up chain can be further continued by a third or even more alarm methods, until it is possible to be sure that when the alarm time comes, the alarm can be given in a manner that fulfills the predefined criterion.

FIG. 2 shows in a rough block diagram a device solution 200 of the invention. The device comprises means for setting 202 a primary alarm method, which are used to set as the primary alarm method an external alarm method. The means 202 for setting the alarm method can thus, depending on the device, set as the alarm method an FM radio channel, IP radio channel or some other data content downloaded from a telecommunications network that is suitable for an alarm or that can be changed into an alarm. The device also comprises means 204 for setting an alarm time. Said means 204 can in the case of a mobile phone be a display, keyboard, user interface menu, and a piece of software required to control these.

Further, the electronic device 200 comprises means 206 for checking an alarm condition relating to the primary alarm method. The means 206 for checking the alarm condition can be implemented in different ways in different embodiments. For instance in the case of an FM radio, the checking means can be implemented as measuring means that can directly measure an analogue radio signal, a signal entering the loudspeaker, or a feedback signal reproduced through the loudspeaker and measured with a microphone. In the case of IP reception, the measuring means 206 can in turn be a piece of software analyzing the content of packets, for instance.

The electronic device also comprises means 210 for giving an alarm. In general, this means for instance a loudspeaker and a piece of software controlling it. However, in the case of a mobile phone, the alarm can also be given as a vibrating call alert or in some other manner. The operation of the different components of the device is controlled from a control unit 208.

FIG. 3 illustrates a device solution of the invention by means of a mobile phone 300 presented as one embodiment. In FIG. 3, the mobile phone 300 is for the sake of clarity divided into a section UI containing the user interface of the device, a section CNTL containing control functions, and a section REC implementing the primary alarm method. Double-ended arrows between the sections show information transfer between the sections. Naturally, inside the sections, there is also information transfer between the device components, but this is not shown for the sake of clarity.

The user interface section UI comprises a keyboard 302, display 304, microphone 306, and loudspeaker 308. The user interface also includes a menu system 310 and FM tuner 312, with which the user can tune the device in to the desired radio channel. The user can set the alarm time by using the keyboard, display, and menu structure, for instance.

The control unit CNTL comprises components of the device that are not directly under the user's control. The set alarm time is compared in a time monitoring unit with the current time. When the time is up, a measuring unit 322 checks the alarm condition relating to the primary alarm method so as to decide, whether the alarm can be given using the primary alarm method. In one embodiment, the unit checking the alarm condition, such as the measuring unit 322, compares the measuring results with settings stored in advance in a setting unit 326 of the device. For making the measurements, the measuring unit 322 instructs a receiver 330 to establish a connection to the primary alarm source 340 that provides for instance the FM radio channel to which the user has tuned in.

In addition to being able to set comparison criteria in advance for the measuring results in the device, in another embodiment the unit 326 for setting the criterion can also be part of the user interface section UI of the device. The user can then set a desired alarm level by using for instance the keyboard, display, loudspeaker, and menu structure. If the comparison made by the measuring unit shows that the properties of the primary alarm method are acceptable, the control unit CNTL uses the primary alarm method in giving the alarm. If the results of the measuring unit 322 show that the primary alarm method does not meet the set requirements, a unit 324 for selecting the alarm selects a secondary alarm method 328 for use.

FIG. 4 illustrates the structure of a typical FM radio receiver. The receiver comprises a receiver antenna 400 for receiving a radio frequency band. A preselector filter 401 selects a reception band, i.e. FM radio frequency band (in Europe 88 to 108 MHz), and an amplifier 402 amplifies a desired signal band. A mixer 404 transforms the received signal to an intermediate frequency. The mixing frequency entering the mixer comes from a shift oscillator 406 whose frequency selection is used to select the desired channel from the frequency band. An intermediate frequency amplifier 408 amplifies the intermediate frequency signal, and a filter 409 filters other interfering external frequencies from the intermediate frequency signal. The amplified signal is directed to a demodulator 410 which restores the original signal transmitted from a transmitter. The audio signal is amplified in a power amplifier 412 before transmission to a loudspeaker 414. In one embodiment of the invention, an FM radio signal is measured before it is used to give an alarm. With reference to FIG. 4, the measurement can be made in the radio frequency amplifier 408 or power amplifier 412, for instance.

In one embodiment, the functionality implementing the invention is realized at least partly in a subassembly 500 of an electronic device, such as mobile phone, which is illustrated in FIG. 5. The subassembly 500 then refers to a device module, which in itself does not form a finished end product, but which is used in making the end product. In the case of a mobile phone, the subassembly can be a circuit board, for instance, in whose memory 502 a computer program executing the functions of the invention is stored, and the program can be read by the device and transformed into functions executed by the device. The subassembly can then comprise means 504 for receiving an alarm time defining the time when the alarm is to be given. In the case of an end product, i.e. mobile phone, this means that the alarm time entered by the user with the keyboard, display and user interface software of the device is transferred to the subassembly.

Further, the subassembly comprises means for checking at the alarm time one or more alarm conditions relating to the primary alarm method. In one embodiment, the means for checking the alarm condition comprise means 506 for defining one or more measuring parameters, and means 508 for comparing the measuring parameter with a pre-set threshold value.

For defining the measuring parameter, the subassembly may include logic that controls the definition of the measuring parameter. The subassembly does not necessarily comprise a loudspeaker, for instance, which is required for forming the measuring parameter value. The subassembly can, however, comprise logic for giving a command in the device to define the measuring parameter value at the alarm time.

The comparison means 508 can compare the measured measuring parameter with the pre-set threshold value. The user may set the pre-set threshold value or it may be a fixed value defined in the device. The comparison means compare the measuring parameter with said threshold value by program, for instance.

The subassembly may also comprise means 510 for deciding on the alarm method. This means that when the alarm time is at hand, the decision-making means 510 communicate with the comparison means 508 and use the result they provide when making the decision on the alarm method. The decision-making means 510 can be configured to decide that the alarm is given using the primary alarm method if the alarm condition is met, for instance when the measuring parameter meets a predefined criterion. Further, the decision-making means may otherwise be configured to decide that the alarm is given using the secondary alarm method. The subassembly 500 does not necessarily include the means for giving the alarm, the means being a loudspeaker, for instance. The subassembly can, however, generate a command to components attached to the subassembly for giving the alarm.

Even though FIG. 5 indicates that the logic of the subassembly is implemented by software, the functionality of the invention can also be implemented with separate logic components or ASIC (application-specific integrated circuit) in an electronic device or subassembly.

Even though the invention has been explained in the above with reference to figures presented by way of example, it is apparent that the invention is not restricted to them but can be modified in many ways within the scope of the inventive idea disclosed in the attached claims.

The invention is claimed is:

1. A method for implementing an alarm in an electronic device, the method comprising:
setting a primary alarm method;
setting a start time for the alarm;
checking at the alarm time one or more alarm conditions relating to the primary alarm method;
giving the alarm at the start time by using the primary alarm method if the alarm condition is met, and
giving the alarm at the start time by using a secondary alarm method if the alarm condition is not met.

2. A method as claimed in claim 1, wherein the primary alarm method is generated outside the electronic device.

3. A method as claimed in claim 1, wherein the alarm condition is that the volume level provided by the primary alarm method in the electronic device exceeds a predefined threshold value.

4. A method as claimed in claim 1, wherein the primary alarm method is the reproduction of a radio channel to which the device is tuned in.

5. A method as claimed in claim 4, wherein the alarm condition is that the device is sufficiently well tuned into the radio channel.

6. A method as claimed in claim 4, wherein the alarm condition is whether the radio channel, to which the device is tuned in, is broadcasting.

7. A method as claimed in claim 1, wherein the secondary alarm method is an alarm generated locally in the device.

8. A method as claimed in claim 1, wherein the electronic device is a mobile phone comprising a keyboard, display, loudspeaker, and microphone.

9. An electronic device comprising:
means for setting a primary alarm method;
means for setting an alarm time;
means for checking at the alarm time one or more alarm conditions relating to the primary alarm method;
means for giving an alarm at the alarm time by using the primary alarm method if the alarm condition is met; and
means for giving an alarm at the alarm time by using a secondary alarm method if the alarm condition is not met.

10. An electronic device as claimed in claim 9, wherein the primary alarm method is generated outside the electronic device.

11. An electronic device as claimed in claim 9, wherein the alarm condition is the volume level provided by the primary alarm method in the electronic device.

12. An electronic device as claimed in claim 9, wherein the secondary alarm method is a sound source stored in the device.

13. An electronic device as claimed in claim 9, wherein the primary alarm method is the reproduction of a radio channel the device is tuned into.

14. An electronic device as claimed in claim 13, wherein the alarm condition is checking of that the device is sufficiently well tuned in to the radio channel.

15. An electronic device as claimed in claim 13, wherein the alarm condition is checking of whether the radio channel to which the device is tuned in is broadcasting.

16. An electronic device as claimed in claim 9, wherein the electronic device is a mobile phone comprising a keyboard, display, loudspeaker, and microphone.

17. A subassembly for an electronic device, comprising:
means for receiving an alarm time defining the time of a primary alarm;
means for checking at the alarm time one or more alarm conditions relating to the primary alarm method;
means for deciding on the alarm method, which deciding means are configured to decide that the alarm is given at the alarm time using the primary alarm method if the alarm condition is met, and
the deciding means are otherwise configured to decide that the alarm is given at the alarm time using a secondary alarm method.

18. A software product comprising:
means for receiving an alarm time defining the time of a primary alarm, wherein the software product comprises:
means for checking at the alarm time one or more alarm conditions relating to the primary alarm method;
means for deciding on the alarm method, which deciding means are configured to decide that the alarm is given at the alarm time using the primary alarm method if the alarm condition is met, and the deciding means are otherwise configured to decide that the alarm is given at the alarm time using a secondary alarm method.

19. An electronic device comprising:

a user interface configured to set a primary alarm method and an alarm time in response to user input; and a control unit configured to check at the alarm time one or more alarm conditions relating to the primary alarm method, configured to give an alarm at the alarm time by using the primary alarm method if the alarm condition is met, and configured to give an alarm at the alarm time by using a secondary alarm method if the alarm condition is not met.

20. A subassembly for an electronic device, comprising:

a memory capable of storing an alarm time defining the time of an alarm, and capable of storing at least primary and secondary alarm methods; and a control unit configured to check at the alarm time one or more alarm conditions relating to the primary alarm method, to issue an alarm at the alarm time using the primary alarm method if the alarm condition is met, and to issue the alarm at the alarm time using a secondary alarm method if the alarm condition is not met.

21. A computer-readable medium having instructions stored thereon which are executable by a computing system for implementing an alarm by performing steps comprising:

receiving an alarm time defining the time of the alarm;

checking at the alarm time one or more alarm conditions relating to a primary alarm method; and deciding on the alarm method, including deciding that the alarm is given at the alarm time using the primary alarm method if the alarm condition is met, and deciding that the alarm is given at the alarm time using a secondary alarm method if the alarm condition is not met.

\* \* \* \* \*